Feb. 14, 1961 P. ORR 2,971,395
TRANSMISSION
Filed June 3, 1955 4 Sheets-Sheet 1

Inventor:
Palmer Orr
By:
Keith J. Bleuer Atty.

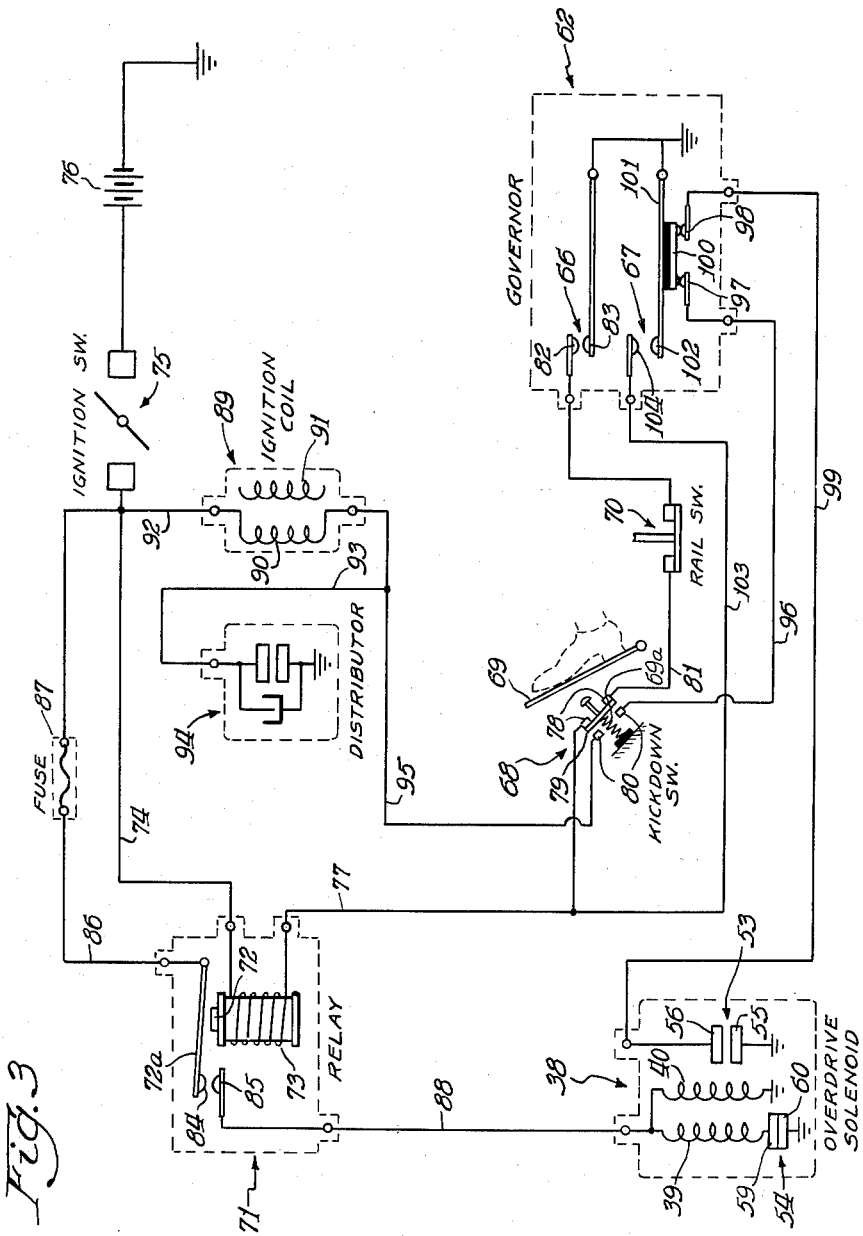

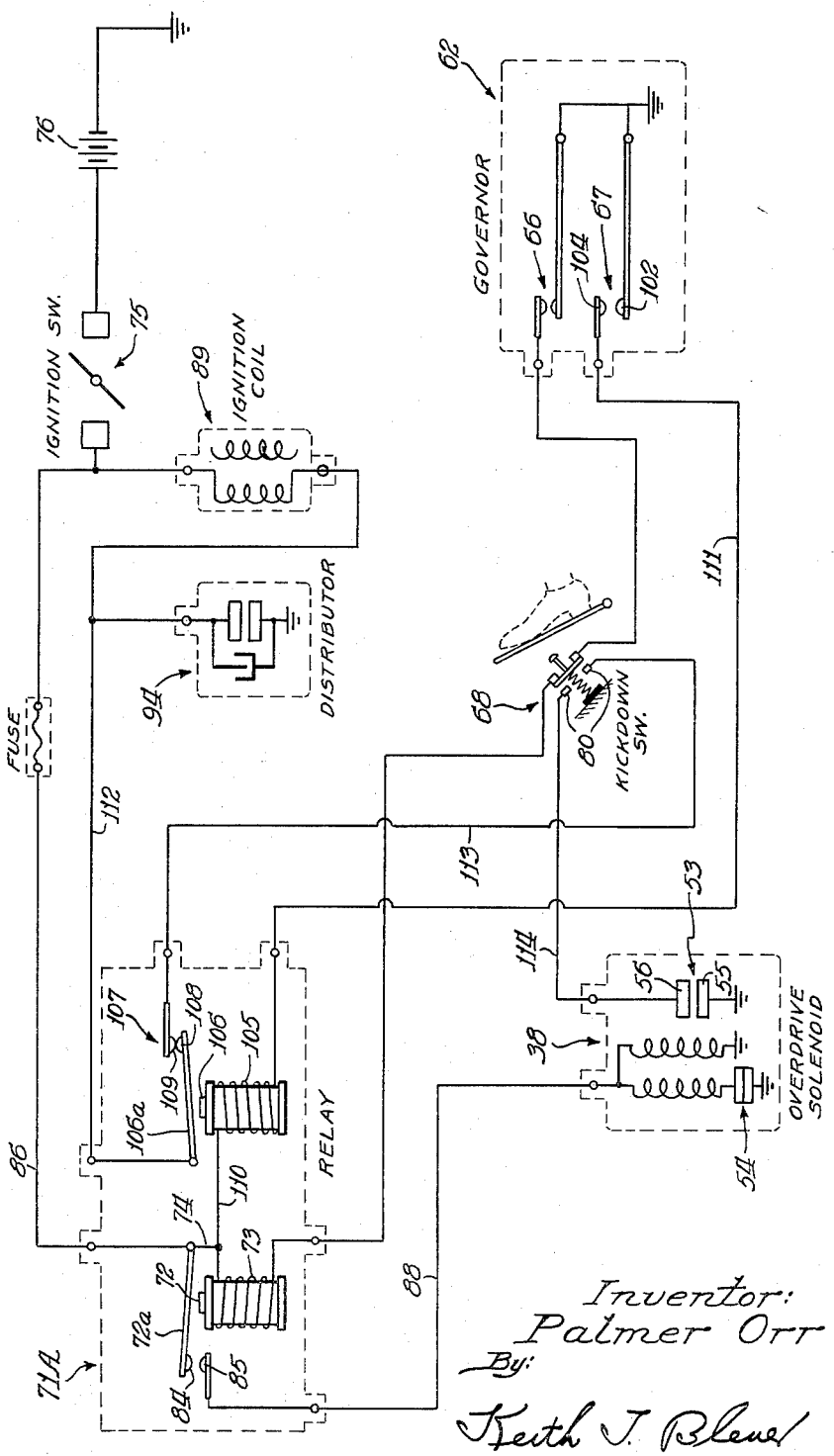

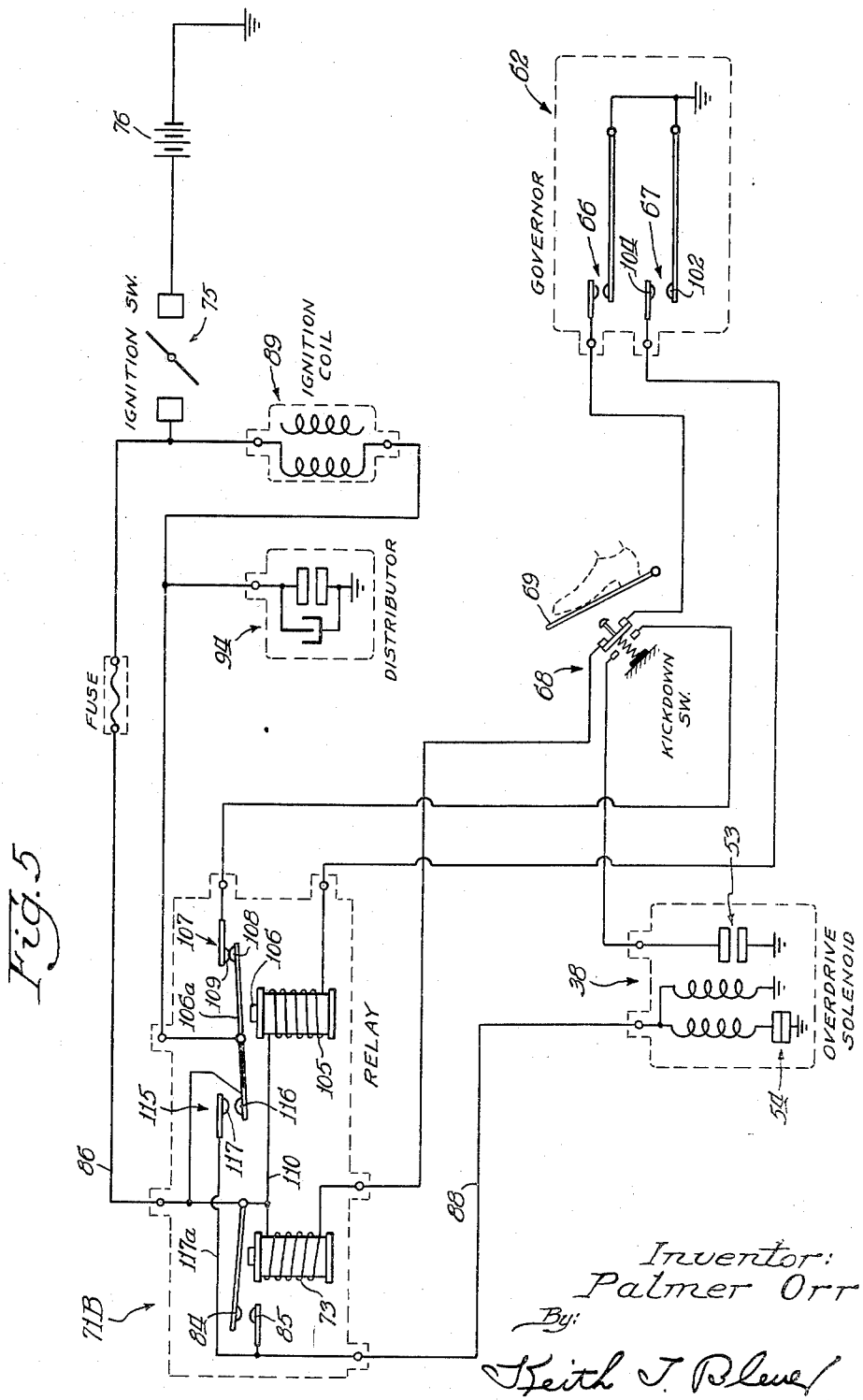

United States Patent Office 2,971,395
Patented Feb. 14, 1961

2,971,395

TRANSMISSION

Palmer Orr, Muncie, Ind., assignor to Borg-Warner Corporation, Chicago, Ill., a corporation of Illinois Filed June 3, 1955, Ser. No. 512,965

5 Claims. (Cl. 74—472)

This invention relates to transmissions for automotive vehicles and more particularly to such transmissions which are commonly termed overdrives.

Overdrive transmissions in use at present generally are provided with a governor driven by the driven shaft of the transmission for conditioning the overdrive unit for a change from direct drive to overdrive above a predetermined speed of the shaft and the vehicle. When the governor so conditions the transmission, it is necessary for the vehicle operator to release the accelerator of the vehicle for finally completing the overdrive power train through the unit. The governor is set to so condition the overdrive for change in drive at some advanced vehicle speed, such as, for example, 25 miles per hour, below which the ability of the vehicle to accelerate is below par or insufficient in overdrive speed ratio.

Overdrive transmissions are also generally provided with an electric control system incorporating a kickdown switch, so that when necessary the operator of the vehicle can, by merely pressing down on the accelerator, cause a transition from overdrive to direct drive. Such kickdown switch is employed, for example, when a high acceleration of the vehicle is desired, as when it is desired to pass another vehicle. However, it has been found desirable to inhibit or prevent such a change from overdrive to direct drive when the vehicle speed reaches a predetermined high speed, for example, 65 to 70 miles per hour, since such a change would place a great deal of stress on the vehicle engine.

It is accordingly an object of this invention to provide an electric control circuit for an overdrive transmission incorporating a governor switch for inhibiting or preventing a change from overdrive to direct drive when the vehicle is traveling at a very high speed.

More particularly, it is an object of this invention to provide an electrical control circuit for an overdrive transmission incorporating a multi-stage governor and a kickdown switch, allowing the vehicle operator to change from overdrive to direct drive in the usual manner at vehicle speeds under, for example, 65 miles per hour, but inhibiting or preventing such a change when the vehicle is travelling at a very high speed, such for example, over 65 to 70 miles per hour.

The invention consists of the novel constructions, arrangements and devices to be hereinafter described and claimed for carrying out the above-stated objects and such other objects as will be apparent from the following description of preferred embodiments of the invention, illustrated with reference to the accompanying drawings, wherein:

Figure 3 is a diagram of an electrical control circuit used in connection with the overdrive transmission shown in the preceding figures and illustrating one embodiment of the invention;

Figure 4 is a diagrammatic showing of an electrical control circuit constituting a second embodiment of the invention; and Figure 5 is a diagrammatic showing of an electrical control circuit constituting a third embodiment of the invention.

Like reference characters designate like parts in the several views.

Figure 1:
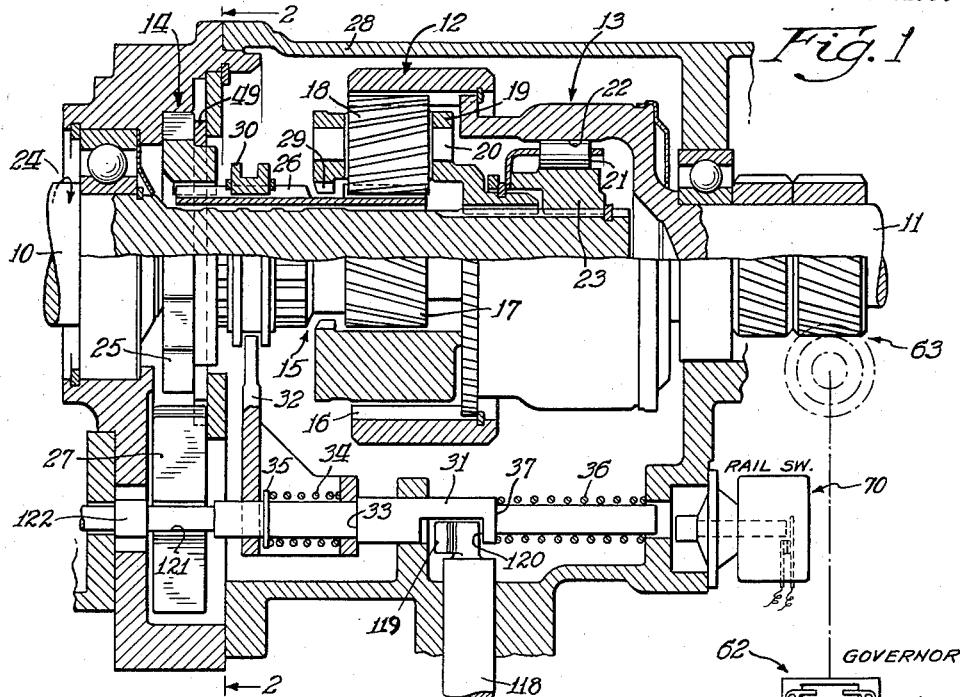
Figure 1 is a longitudinal sectional view of an overdrive transmission and illustrating diagrammatically the multi-stage governor of the invention.
Figure 2:
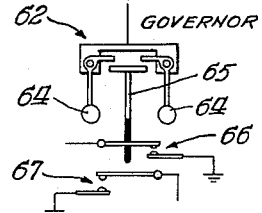
Figure 2 is a sectional view taken on line 2—2 of Figure 1, looking in the direction of the arrows.
Figure 2:
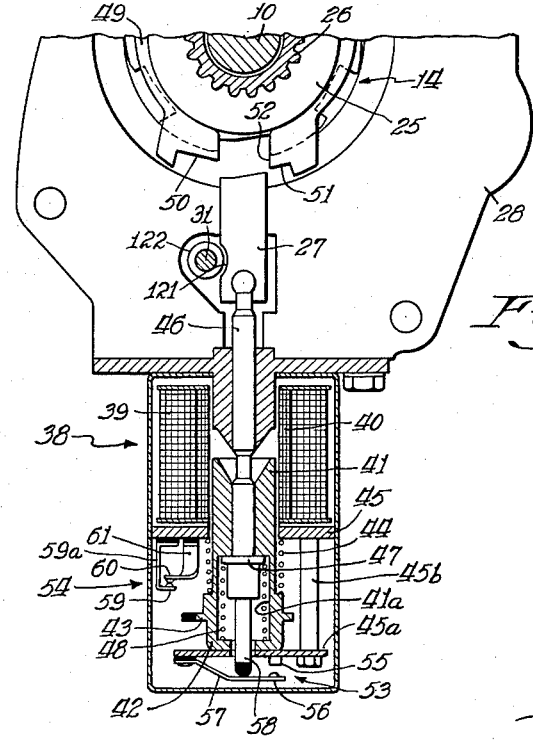

Referring now to the drawings, and in particular to Figures 1 and 2, the illustrated transmission comprises generally a drive shaft 10, a driven shaft 11, a planetary gear set 12, a one-way clutch unit 13, a positive type brake 14, and a positive type clutch 15. The drive shaft 10 is adapted to be connected with the engine of the vehicle in which the transmission is installed, and the driven shaft 11 is adapted to be connected with the driving wheels of the vehicle by any suitable means.

The planetary gear set 12 comprises a ring gear 16, a sun gear 17, a plurality of planet gears 18 in mesh with the sun and ring gears, and a carrier 19 for the planet gears. Each of the planet gears 18 is rotatably disposed on a pinion shaft 20 fixed in the carrier 19. The ring gear 16 is connected with the driven shaft 11, and the sun gear 17 is rotatably disposed on the drive shaft 10. The carrier 19 is splined to the drive shaft 10.

The one-way clutch unit 13 comprises a plurality of rollers 21 disposed between an internal cylindrical surface 22 formed in the driven shaft 11 and a hub 23 fixed to the drive shaft 10. The hub 23 is provided with a plurality of cams thereon (not shown), one for each of the rollers 21, so that the rollers 21 will tend to engage between the cams and cylindrical surface to provide a direct connection between the shaft 10 and the driven shaft 11 when the drive shaft rotates in its normal direction of rotation, as indicated by the arrow 24. The one-way clutch unit 13 is of an ordinary construction, and further details are not believed necessary to illustrate the unit.

The brake 14 comprises a slotted element 25 splined by means of splines 26 to the sun gear 17. A pawl 27 radially movable in a portion fixed with respect to the transmission casing 28 is provided for moving into engagement with the slotted element 25 for braking this element and for thereby holding the sun gear 17 stationary.

The clutch 15 comprises the splines 26 and teeth 29 formed on the carrier 19. The sun gear 17 is adapted to be moved axially with respect to the shafts 10 and 11 to bring the splines 26 into engagement with the teeth 29 for engaging the clutch. Movement may be imparted to the sun gear 17 for engaging or disengaging the clutch 15 by means of a collar 30 fixed on the sun gear.

A shift rail 31 is slidably disposed in the transmission casing 28 and carries a shift fork 32 thereon which is in engagement with the collar 30. The shift rail 31 is formed with a shoulder 33 against which the shift fork 32 is adapted to bear, and a spring 34 is provided between a portion of the shift fork and a washer 35 fixed to the shift rail. A spring 36 is provided between a shoulder 37 on the shift rail and a portion of the casing 28 tending to hold the shift rail in the position which it is illustrated.

The illustrated transmission provides a direct drive and an overdrive between the shafts 10 and 11. With the clutch 15 and brake 14 disengaged, the one-way clutch 13 engages to provide a one-way direct drive between the shafts 10 and 11. A two-way direct drive between the shafts is provided when the clutch 15 is engaged by meshing the splines 26 with the teeth 29. The engagement of the clutch 15 has the effect of locking up the planetary unit 12, so that its parts, including its gears 16, 17 and 18 and its carrier 19, rotate together as a unit. An overdrive is provided by engaging the brake 14, with the clutch 15 being disengaged. The brake 14 functions to hold the sun gear 17 stationary to render this element the reaction gear of the gear set, and the carrier 19 is driven along with the shaft 10 since it is fixed thereto; and the gearing functions to drive the ring gear 16 and thereby the driven shaft 11 fixed thereto at an overdrive or increased speed with respect to the shaft 10.

The shift rail 31 is provided for shifting the sun gear 17. The shift rail 31 when moved to the right as seen in Figure 1 functions through the action of the spring 34 to move the splines 26 into engagement with the teeth 29, and when the shift rail 31 is moved in the opposite direction, it functions by means of its shoulder 33 bearing on the fork 32 to disengage the splines 26 with respect to the teeth 29.

The pawl 27 is moved by means of an electromagnetic solenoid motor 38. The solenoid motor 38 comprises an energizing coil 39 and a holding coil 40 surrounding a movable armature 41 for urging the armature upwardly as viewed in Figure 2. A cap-like element 42 is fixed to the armature 41 at its lower end and is provided with an annular rim 43. A spring 44 is provided between a stationary annular plate-like member 45 and the annular rim 43 of the element 42 for yieldably holding the armature in its illustrated position. A second stationary plate-like member 45a is disposed below the member 45 and the element 42, and is spaced from the member 45 by means of spacers 45b. A rod 46 is connected with the pawl 27 and slidably extends through the armature 41. The rod 46 is provided with a flanged collar 47 received in an opening 41a in the armature and abuts the bottom of the opening, and a spring 48 is provided between the flanged collar 47 and the internal end surface of the element 42.

An oscillatable blocker ring 49 is disposed on the slotted element 25 and is frictionally engaged therewith, so as to tend to be rotated along with the slotted element. The blocker ring 49 comprises ledges 50 and 51 against which the pawl 27 may rest and is broken to provide a slot 52 through which the pawl 27 may move.

Upon energization of the solenoid motor 38 by energizing its windings 39 and 40, the armature 41 is drawn into the motor 38 against the action of the spring 44 and since the pawl 27 is connected to the armature 41 through the spring 48 and the rod 46, movement of the armature into the motor 38 tends to cause a radially inward movement of the pawl 27. Assuming that the blocker ring 49 is rotated in a counter-clockwise direction from its position as shown in Figure 2, so that the ledge 50 is in the path of movement of the pawl 27, the pawl will move onto the ledge 50 and further movement of the pawl will be blocked; and, due to the movement of the armature, the spring 48 disposed within the member 42 will become compressed. The spring 48 is thus cocked, so as to cause a further movement of the pawl 27 into engagement with the slotted element 25 when the blocker 49 is rotated in the clockwise direction, as seen in Figure 2, to bring its ledge 50 out of line of movement of the pawl 27 and to bring its slot 52 into register with the line of movement of the pawl. Such movement of the blocker ring 49 is brought about when the speed of the drive shaft 10 is decreased with respect to the speed of the driven shaft 11 with an accompanying overrunning of the one-way clutch 13, assuming the vehicle has previously been driven in direct drive through the one-way clutch 13, so as to reduce the speed of rotation of the slotted element 25 until finally the slotted element comes to rest and reverses its direction of rotation to a slight degree. The pawl 27 may then move into engagement with the slotted element 25, so that the brake 14 is engaged and the transmission is in overdrive ratio.

The solenoid motor 38 also comprises the switches 53 and 54. The switch 53 comprises contacts 55 and 56, the contact 55 being attached to the member 45a and the contact 56 being carried by a spring arm 57 attached to and insulated from the member 45a. The spring arm 57 abuts an extension 58 of the rod 46 and maintains the contacts 55 and 56 out of contact with each other until the pawl 27 is moved radially inwardly. The switch 54 comprises contacts 59 and 60, the contact 59 being carried by a fixed bracket 59a fixed to and insulated from the member 45 and the contact 60 being carried by a spring arm 61 attached to the member 45.

The switch 54 is closed and the switch 53 is opened when the motor 38 is in its deenergized condition, such as it is, for example, illustrated in Figure 2. When the windings 39 and 40 are energized, the armature 41 is drawn within the windings and this tends to move the pawl 27 radially inwardly, as has been described. The cap-like element 42 fixed to the armature 41 moves inwardly with the armature and when it reaches a position closely adjacent to its limit of movement, the rim 43 meets the spring arm 61 and moves the spring arm 61 to break the contact between the contacts 59 and 60, thereby opening the switch 54. When the pawl 27 is moved into the pawl engaging position, as has been described, the extension 58 of the rod 46, due to its inward movement, allows the contact 56 carried by the spring arm 57 to meet the contact 55, thereby closing the switch 53. The spring arms 57 and 61 function to yieldably hold the contacts 55 and 56 and 59 and 60, respectively, in contact, when the switches 54 and 53 are closed.

The solenoid motor 38 is controlled by means of the electric systems shown in Figures 3, 4 and 5. In each of these control systems, there is included a governor 62 of the multi-stage type driven by means of gearing 63 from the driven shaft 11. The governor may comprise pivoted weights 64 acting on a plunger or stem 65 which in turn acts on switches 66 and 67 when the governor and shaft 11 rotate above predetermined speeds. The switches 66 and 67 are connected with a kick-down switch 68 controlled by the accelerator 69 of the vehicle, in a manner to be described. The accelerator 69 is connected with the throttle of the vehicle engine (not shown) in the usual manner, so that when the accelerator is depressed the vehicle throttle is opened, and the accelerator is adapted to act on the kick-down switch 68 in the manner to be described.

A rail switch 70 is connected in series with the switches 66 and 68, and this switch is controlled by means of the shift rail 31 (see Figure 1), so that the switch 70 is opened when the rail 31 is moved to the right, as seen in Figure 1, to engage the lockup clutch 15.

Attention is now directed to Figure 3 wherein there is illustrated a diagram of an electrical control system constituting one embodiment of the present invention for controlling the overdrive transmission. This system comprises a relay 71 having the usual magnetizable core indicated at 72 and a movable armature 72a attached to the core when magnetized. A winding 73 is disposed about the core for magnetizing it, and the winding 73 at one end is connected by a lead 74 with the ignition switch 75 of the vehicle, which in turn is connected with the vehicle battery 76 having one terminal grounded, as indicated. The winding 73 at its other end is connected by means of a lead 77 with the kickdown switch 68.

The kickdown switch 68 comprises a pair of contacts 78 adapted to be connected by means of a switch blade 79 and a pair of contacts 80 also adapted to be connected by means of the blade 79 in a different position of the blade. One of the contacts 78 is connected with the lead 77 as shown. The switch blade 79 is yieldably held in its illustrated position connecting the contacts 78 by means of a spring 69a. The kickdown switch 68 is actuated by the vehicle accelerator 69 when the vehicle accelerator is moved to an open throttle kickdown position for moving the switch blade 79 out of contact with the contacts 78 and into contact with the contacts 80.

The other of the contacts 78 is connected by means of a lead 81 with a fixed contact 82 of the governor switch 66. A movable contact 83 of the governor switch 66 is grounded as shown. The switch 66, comprising the contacts 82 and 83 is hereinafter referred to as the overdrive stage of the governor. The rail switch 70 may be provided in the lead 81 in series with the kickdown switch and the overdrive stage of the governor, so that the overdrive may be locked out of operation completely, if so desired.

The relay armature 72a carries a contact 84 movable with the armature into contact with a stationary contact 85 when the relay is energized. The contact 84 is connected by means of a lead 86 with the ignition switch 75; and, in accordance with usual practice, a fuse 87 is connected in series in the line 86. The contact 85 is connected by means of a lead 88 with one end of each of the solenoid armature coils 39 and 40. The other end of the coil 40 is grounded as shown, and the other end of the coil 39 is connected with the contact 59 of the switch 54, which has its other contact 60, carried by the spring arm 61, grounded.

The ignition system of the vehicle engine comprises the usual ignition coil generally indicated at 89 having a primary winding 90 and a secondary winding 91. The primary winding 90 is connected by means of a lead 92 with the ignition switch 75, and provides a high voltage and intermittent current flow through the secondary winding 91 connected with the usual spark plugs of the vehicles (not shown) in accordance with the usual practice. The primary winding 90 of the ignition coil 89 on its other end is connected by means of a lead 93 with the usual interrupter switch or distributor, generally indicated at 94.

One of the contacts 80 of the kickdown switch 68 is connected by means of a lead 95 with the distributor, and the other contact 80 is connected by means of a lead 96 to a fixed contact 97 in what will be referred to as a grounding circuit, and which contact is associated with the governor 62.

A second fixed contact 98 associated with the governor 62 is connected by means of a lead 99 to the contact 56 of the switch 53, heretofore described, the other contact 55 of which is grounded as shown. A metal contact bar 100, adapted to contact both the contacts 97 and 98 in one certain position of the bar 100, is carried by a movable support 101 for a contact 102 of the switch 67, hereinafter referred to as the inhibitor stage of the governor. A strip of insulating material is disposed between the contact bar 100 and the support 101, so as to insulate the bar therefrom.

A lead 103 is connected to the lead 77 at one end and at its other end to the other contact 104 of the switch 67 in the inhibitor stage of the governor. The contact 102 of the switch 67 is grounded as shown. The lead 103 shunts the kickdown switch 68, as illustrated.

As heretofore mentioned, the governor employed in the electric circuit is of the multi-stage type having what will be referred to as an overdrive stage and an inhibitor stage. The overdrive stage comprises the switch 66 and the contacts 82 and 83 thereof, and the inhibitor stage comprises the switch 67 and the contacts 102 and 104 thereof. The governor is so constructed that when the vehicle reaches a critical speed, such as, for example, 25 miles per hour, as heretofore mentioned, the contacts 82 and 83 are caused to meet to thereby close the switch 66, such action being caused by the movement of the governor plunger or stem 65. The contacts 102 and 104 of the switch 67 of the inhibitor stage of the governor are conditioned to be placed in contact with one another, thereby closing the switch 67, at a higher speed of the vehicle, such as, for example, 65 to 70 miles per hour, by further movement of the governor plunger or stem 65, the purpose of which will be described.

Below the critical governor speed, that is, a vehicle speed of 25 miles per hour, the winding 73 is deenergized since the switch 66 is open. When this critical governor speed is reached, the contacts 82 and 83 close and the circuit through the winding 73 is completed and the relay 71 is energized. Such energization causes the armature 72a of the relay to move to close the contacts 84 and 85. Closure of the contacts 84 and 85 causes an energization of the windings 39 and 40 of the electromagnetic motor 38. Such energization of the windings 39 and 40 causes the armature 41 of the motor 38 to be drawn inwardly of the motor and causes the pawl 27 to be moved toward the slotted element 25. During ordinary driving, the blocker ring 49 is positioned with its ledge 50 in line of movement of the pawl 27 so that the pawl is blocked. During this movement of the armature 41, the spring 48 is compressed.

With the parts being in these conditions, the vehicle driver may release the accelerator 69 to decrease the speed of the drive shaft 10 with respect to the driven shaft 11, and the slotted element 25 and sun gear 17 will decrease in speed with decrease in speed of the drive shaft 10 until eventually the sun gear 17 and slotted element will stop and will reverse their direction of rotation. Upon this reversal, the blocker ring 49 is moved into its position in which it is illustrated in Figure 2 with its slot 52 in the line of movement of the pawl 27, and the pawl 27 will complete its stroke and engage the slotted element 25. The transmission is then in overdrive.

The pawl rod 46 when it is moved inwardly in the motor 38 causes the contacts 55 and 56 to engage thereby closing the switch 53. Also movement of the armature inwardly causes the annular rim 43 to contact the arm 61 of the switch 54 to separate contacts 59 and 60 to open the switch 54. The switch 54 is in series with the winding 39 and thereby breaks the circuit through this winding, so that only the winding 40 is effective to hold the armature 41 in its energized position within the motor 38. The winding 40 is sufficient for this purpose and draws a comparatively small current compared to the two windings in parallel.

Below the speed at which the switch 67 or the inhibitor stage of the governor is effective, that is, 65 to 70 miles per hour, the transmission may be downshifted from overdrive ratio to direct ratio by moving the accelerator 69 to an open throttle position thereby moving the switch blade 79 of the kickdown switch 68 from contact with the contacts 78 and into contact with the contacts 80. This movement of the accelerator 68 has the effect of breaking the circuit through the winding 73 and thereby deenergizes the relay 71. The armature 72a in the relay 71 returns to its original position, and the contacts 84 and 85 in the relay are opened. Opening of the contacts 84 and 85 has the effect of breaking the circuit through the winding 40, and the spring 44 acts through the cap 43, armature 41 and the collar 47 fixed to the pawl rod 46 and tends to move the pawl 27 out of engagement with the slotted element 25 to its inoperative position, in which it is illustrated in Figure 2. Since the throttle of the vehicle is open, however, the slotted element 25 bears on the pawl 27 and prevents its withdrawal from the slotted element unless some means is provided for breaking the torque delivered by the engine.

Means for breaking the torque through the transmission for this purpose includes the contacts 80 of the kickdown switch 69. When the contacts 80 are contacted or bridged by the switch blade 79, the ignition circuit is grounded, and the torque delivered by the engine is interrupted, and the spring 44 is thereupon effective to withdraw the pawl 27 from the slotted element 25. The transmission is then in direct drive, with the power flow being through the one-way clutch 13. The grounding circuit is through the lead 95, the contacts 80, the lead 96, the contact 97, the contact bar 100, the contact 98, the lead 99, and the switch 53. Thus, the distributor 94 is grounded causing the vehicle engine to miss firing and thereby interrupting torque.

When the vehicle speed reaches a high value, for example, 65 or 70 miles per hour, the switch 67 or the inhibitor stage of the governor is actuated, that is, the governor plunger or stem 65 contacts the arm 101 causing it to move thereby moving the contact 102 into contact with the contact 104, so that the switch 67 is closed. This movement of the arm 101 breaks the contact between the contact bar 100 and the fixed contacts 97 and 98. Actuation of the kickdown switch 68 by moving the vehicle accelerator 69 to open throttle kickdown position at this speed of the vehicle is ineffective to cause a change from overdrive to direct drive ratio. This is so because the contacts 102 and 104 are in contact with each other above the high vehicle speed, for example, 65 or 70 miles per hour, and effectively ground the winding 73 of the relay 71, so that regardless of the fact that the grounding circuit for the relay winding 73 is broken by the accelerator, nevertheless, the relay 71 remains energized and there is no tendency for the pawl 27 to be moved out of engagement with the slotted element 25. Also, no grounding circuit can be completed by completion of an electrical circuit between the kickdown contacts 80. The circuit through the lead 77, the lead 103 and the switch 67 is essentially the same as the circuit through the lead 77, the contact 78, the lead 81 and the switch 66. Therefore, the vehicle remains in overdrive regardless of the manipulation of the accelerator and the vehicle is travelling at the aforementioned high speed.

Attention is now directed to Figure 4, wherein there is illustrated a second embodiment of the electrical system for controlling the overdrive unit and inhibiting a change from overdrive to direct drive at speeds of 65 to 70 miles per hour. The operation of the control system for the overdrive unit when the vehicle speed reaches the lower critical speed, that is, 25 miles per hour and up to the speed at which the inhibitor stage of the governor is effective, that is, 65 to 70 miles per hour, is the same as described with reference to the Figure 3 embodiment, and further description is considered unnecessary. The difference between the Figure 3 and Figure 4 embodiments is in the electrical circuit associated with the inhibitor stage of the governor.

The Figure 4 embodiment of the electrical controls includes a relay 71A having, in addition to the core 72, the armature 72a, the winding 73 and the contacts 84 and 85, a second winding 105 having a core 106 and an armature 106a and a switch 107 having contacts 108 and 109 associated with the second winding, core and armature, the contact 108 being carried by the armature 106a. The contacts 108 and 109 of the switch 107 are normally in contact with one another. The winding 105 is connected to the input lead 74 of the winding 73 and the relay 71A by means of a lead 110 at one end, and the other end of the winding 105 is connected to the contact 104 of the switch 67 in the inhibitor stage of the governor by means of a lead 111. The contact 108 is connected by means of a lead 112 to the distributor 94, and the contact 109 is connected by means of a lead 113 to one of the contacts 80 of the kickdown switch 68. The other contact 80 of the kickdown switch is connected by means of a lead 114 to the contact 56 of the switch 53 of the overdrive solenoid motor 38. When the vehicle speed reaches a speed of over 65 or 70 miles per hour, the switch 67 comprising contacts 102 and 104 is closed by movement of the governor plunger 65. Closing of the switch 67 energizes the winding 105 and its associated core and moves the armature 106a to cause the contacts 108 and 109 of the switch 107 to open, thereby opening the switch 107.

When the kickdown switch 68 is actuated at these high vehicle speeds, the winding 73 and the relay 71A is deenergized, so that the armature 72a moves from contact with the core 72 and breaks the contact between the contacts 84 and 85 and the circuit to the solenoid motor is broken. However, because of the opening of the switch 107, a grounding circuit for the distributor 94 is not provided by this movement of the kickdown switch, and the torque delivered by the engine is not interrupted. With no interruption of the engine torque, the slotted element bears on the pawl 27, and the spring 44 in the solenoid motor 38 is not effective to withdraw the pawl 27 from the slotted element 25, and the transmission remains in overdrive.

Attention is now directed to Figure 5, wherein there is illustrated a third embodiment of the electrical controls for the overdrive unit, incorporating means to inhibit a change from overdrive to direct drive when the vehicle speed reaches a predetermined high value, such as, for example, over 65 to 70 miles per hour.

These electrical controls are substantially the same as the controls illustrated in Figure 4, the main difference being that the relay 71B has an additional relay portion 115 including contacts 116 and 117 connected in parallel with the contacts 84 and 85 by means of leads 110 and 117a. The contacts 116 and 117 are actuated by the same winding 105 as are the contacts 108 and 109 and by the same armature 106a.

The operation of the overdrive and its associated Figure 5 control for speeds under 65 or 70 miles per hour is the same as described with reference to the Figure 3 embodiment, and it is considered that a description of the Figure 3 embodiment will suffice. When the vehicle speed reaches 65 or 70 miles per hour, and the kickdown switch 68 is actuated, the winding 105 and its associated core 106 are energized since the contacts 102 and 104 in the inhibitor stage of the governor or the switch 67 are in contact, and therefore, the switch 107 is opened in the same manner as described with reference to the Figure 4 embodiment. However, the winding 105 and its associated core 106 when energized, causes the armature 106a to make contact between the contacts 116 and 117 of the relay portion 115 and while the contacts 84 and 85 in the relay 71B are opened, as in the Figure 4 embodiment, the parallel circuit incorporating the relay portion 115 prevents the deenergization of the overdrive solenoid 38. This parallel circuit includes the lead, 86, the lead 110, the contacts 116 and 117 of the relay portion 115, the lead 117a and the lead 88 to the solenoid 38. Since the overdrive circuit will always be completed at high vehicle speeds of over 65 or 70 miles per hour and also that as in the case of the Figure 4 embodiment there is no grounding circuit provided for grounding the distributor, regardless of what the driver does in the way of throttle manipulation, it will be impossible for the driver to change from overdrive to direct drive at these high speeds or above these high speeds.

The external controls for the transmission comprise, in addition to the accelerator control switch 68, a control shaft 118 extending through the transmission casing 28. The shaft 118 is provided with a cam portion 119 that is loosely disposed within a slot 120 formed in the rail 31. The shift rail 31 may be moved to the right as seen in Fig. 1 by rotating the shaft 118 to bring the cam portion 119 to bear against the right end of the slot 120, to thereby engage the lockup clutch 15 to lockup the planetary gear set 12 and provide a 1 to 1 two-way drive between the shafts 10 and 11. This movement of the shift rail 31 actuates the rail switch 70 which, in the Fig. 3 form of the invention, is in series with the governor switch 66 and prevents an upshifting into overdrive speed ratio.

An additional interlock mechanism is preferably provided between the rail 31 and the pawl 27 which comprises a slot 121 in the pawl and a boss 122 formed on the rail 31. When the rail 31 is moved to the right by means of the shaft 118 for locking up the transmission by engagement of the clutch 15, the boss 122 is moved into the slot 121 so as to lock the pawl 27 in its disengaged position. The slot 121 and boss 122, as well as the switch 70, thus prevent a simultaneous completion of a two-way direct drive by engagement of the clutch 15 and of the overdrive speed ratio, which is also a two-way drive, by engagement of the pawl 27 with the slotted element 25.

I have advantageosuly provided three electrical control systems for controlling the overdrive transmission and preventing or inhibiting a change from overdrive to direct drive above a predetermined speed of the vehicle, such as for example, 65 or 70 miles per hour.

The Figure 4 embodiment of the controls is quite simple and obtains its action due to the fact that no torque interruption by grounding of the vehicle distributor is provided above a certain high speed of the vehicle, although the overdrive solenoid motor 38 is deenergized when the accelerator is moved to an open throttle position. The Figure 3 embodiment provides an additional action, namely, of maintaining the solenoid 38 energized even after the kickdown switch 68 has been moved into its kickdown position, so that there is no tendency for the pawl to come out of engagement with the slotted element and clutch disengagement of the pawl with the slotted element cannot occur regardless of any lurches in the drive due to uneven grounds. The Figure 5 electrical controls have the same advantage as the Figure 3 controls but obtain the advantage with a simpler governor, using additional relay contacts in lieu of the governor contacts 97 and 98.

While I have described the inhibitor stage of the governor as being effective at speeds of 65 or 70 miles per hour, it is to be expressly understood that it is within the scope of my invention to construct the inhibitor stage of the governor to be effective at other vehicle speeds, if so desired.

In the previous description, I have referred to a multistage governor including the overdrive stage and the inhibitor stage. It is within the scope of my invention to provide two separate governors, one of which is effective at the low vehicle speed, such as for example, 25 miles per hour and the other is effective at higher vehicle speeds, such as, for example, 65 or 70 miles per hour. Such separate governors may be driven by the driven shaft of the vehicle in the usual manner and in the same manner as the multi-stage governor described.

While certain preferred embodiments of my invention have been specifically disclosed, it is understood that the invention is not limited thereto, as many variations will be readily apparent to those skilled in the art, and the invention is to be given its broadest possible interpretation within the terms of the following claims.

I claim:

1. In a transmission for an automotive vehicle having a driving engine with a throttle and an ignition system, the combination of a drive shaft, a driven shaft, means for providing a power train between said shafts and including a positive engaging brake having parts which are engaged for rendering the power train effective, an accelerator for the engine throttle, means under the control of said accelerator for breaking said power train when the accelerator is moved toward open throttle position and including ignition grounding means for disabling said ignition system to relieve torque thrust on said parts of the positive engaging brake to permit them to disengage, and governor mechanism responsive to the speed of one of said shafts for rendering said ignition disabling means inoperative so as to maintain said positive engaging brake engaged and said power train completed when said last-named shaft is rotating above a predetermined speed regardless of movement of said accelerator toward open throttle position.

2. In a transmission for an automotive vehicle having a driving engine with an ignition system, the combination of a drive shaft, a driven shaft, means for providing a low speed power train between said shafts and including a one-way engaging device for completing the power train, means for providing a high speed power train between said shafts and including a positive engaging brake having parts which are engaged for rendering the power train effective, means for breaking said high speed power train by disengaging said positive engaging brake so that said one-way engaging device engages to complete said low speed power train and including ignition grounding means for disabling said ignition system to relieve torque thrust on said parts of said positive engaging brake to permit them to disengage, and governor mechanism responsive to the speed of one of said shafts for rendering said ignition disabling means inoperative so as to maintain said positive engaging brake engaged and said high speed power train completed when said last-named shaft is rotating above a predetermined speed.

3. In a transmission for an automotive vehicle having a driving engine with a throttle and with an ignition system, the combination of a drive shaft, a driven shaft, means for providing a low speed power train between said shafts and including a one-way engaging device for completing the power train, means for providing a high speed power train between said shafts and including a positive engaging brake having parts which are engaged for rendering the power train effective, an accelerator for the engine throttle, means under the control of said accelerator for disengaging said positive engaging brake for breaking said high speed power train so that said low speed power train is completed by engagement of said one-way engaging device when the accelerator is moved toward an open throttle position, said last-named means including ignition grounding means for disabling said ignition system to relieve torque thrust on said parts of said positive engaging brake to permit them to disengage when the accelerator is moved toward open throttle position, and governor mechanism responsive to the speed of said driven shaft for rendering said ignition disabling means inoperative so as to maintain said positive engaging brake engaged and said high speed power train completed regardless of movement of said accelerator toward open throttle position when said driven shaft is rotating above a predetermined speed.

4. In a transmission for an automotive vehicle having a driving engine with a throttle and with an ignition system, the combination of a drive shaft, a driven shaft, means for providing a low speed power train between said shafts and including a one-way engaging device for completing the power train, means for providing a high speed power train between said shafts and including a positive engaging brake having parts which are engaged for rendering the power train effective, an accelerator for the engine throttle, means under the control of said accelerator for disengaging said positive engaging brake when said accelerator is moved to an open throttle kickdown position, said last-named means including a grounding switch closed by said accelerator in its kickdown position and a grounding circuit for grounding said ignition system and disabling it to relieve torque thrust on said parts of said positive engaging brake to permit them to disengage, speed responsive mechanism driven by said driven shaft, and switch mechanism in said grounding circuit and under the control of said speed responsive means so that the switch mechanism is opened above a predetermined speed of said driven shaft so as to render said ignition disabling means inoperative and maintain said positive engaging brake engaged and said high speed power train completed when said driven shaft is rotating above a predetermined speed.

5. In a transmission for an automotive vehicle having a driving engine with a throttle and with an ignition system, the combination of a drive shaft, a driven shaft, means for providing a low speed power train between said shafts and including a one-way engaging device for completing the power train, means for providing a high speed power train between said shafts and including a positive engaging brake having parts which are engaged for rendering the power train effective, means for actuating said positive engaging brake and including a motor and a control circuit for the motor, first speed controlled switch mechanism in said circuit responsive to the speed of said driven shaft for completing said circuit above a predetermined speed of said driven shaft for energizing the motor to initiate engagement of said positive engaging brake and render said high speed power train effective, an accelerator for the engine throttle, means including a switch in said circuit controlled by said accelerator when the latter is moved to an open throttle kickdown position for opening the switch and de-energizing said motor to initiate disengagement of said positive engaging brake for changing from said high speed to said low speed power train, a grounding circuit for said ignition system and including a switch under the control of said accelerator and closed when the accelerator is moved to said kickdown position for completing the grounding circuit to disable the ignition system and thereby relieve torque thrust on said parts of said positive engaging brake to permit them to disengage when the accelerator is moved to its said kickdown position, second speed controlled switch mechanism in said grounding circuit responsive to the speed of said driven shaft and opened when the driven shaft speed reaches a higher predetermined speed for rendering said grounding circuit inoperative so as to maintain said positive engaging brake engaged and said high speed power train effective, and a third speed responsive switch mechanism responsive to the speed of said driven shaft and closed at said higher predetermined driven shaft speed for providing a circuit in parallel with said first-named switch opened by movement of said accelerator to its kickdown position for maintaining said motor energized above said higher predetermined driven shaft speed.

References Cited in the file of this patent

UNITED STATES PATENTS

| | | |
|---|---|---|
| 2,267,603 | Claytor | Dec. 23, 1941 |
| 2,281,916 | Claytor | May 5, 1942 |
| 2,333,668 | Neracher et al. | Nov. 9, 1943 |
| 2,606,456 | Dodge | Aug. 12, 1952 |
| 2,911,856 | Simpson et al. | Nov. 10, 1959 |